United States Patent
Ängquist et al.

(10) Patent No.: US 6,984,962 B2
(45) Date of Patent: Jan. 10, 2006

(54) DEVICE AND A METHOD FOR VOLTAGE CONTROL IN AN ELECTRIC TRANSMISSION NETWORK

(75) Inventors: Lennart Ängquist, Enköping (SE); Björn Thordvaldsson, Kollbäck (SE)

(73) Assignee: ABB AB, Västerås (SE)

(*) Notice: Subject to any disclaimer, the term of this patent is extended or adjusted under 35 U.S.C. 154(b) by 153 days.

(21) Appl. No.: 10/433,085

(22) PCT Filed: Nov. 20, 2001

(86) PCT No.: PCT/SE01/02557

§ 371 (c)(1),
(2), (4) Date: Oct. 7, 2003

(87) PCT Pub. No.: WO02/45235

PCT Pub. Date: Jun. 6, 2002

(65) Prior Publication Data

US 2004/0052015 A1  Mar. 18, 2004

(30) Foreign Application Priority Data

Nov. 30, 2000 (SE) .................. 0004415

(51) Int. Cl.
G05F 1/70 (2006.01)
G05F 3/00 (2006.01)
(52) U.S. Cl. .................. 323/207; 323/208
(58) Field of Classification Search .......... 323/205, 323/207–210; 307/102
See application file for complete search history.

(56) References Cited

U.S. PATENT DOCUMENTS

| | | | |
|---|---|---|---|
| 3,968,422 A | | 7/1976 | Waldmann |
| 4,891,570 A | | 1/1990 | Nakamura et al. |
| 5,329,221 A | * | 7/1994 | Schauder .............. 323/207 |
| 5,642,007 A | * | 6/1997 | Gyugyi et al. .............. 307/102 |
| 5,672,956 A | | 9/1997 | Fukui et al. |
| 6,075,349 A | * | 6/2000 | Okayama .............. 323/207 |
| 6,114,841 A | * | 9/2000 | Hasler et al. .............. 323/210 |
| 6,242,895 B1 | * | 6/2001 | Fujii et al. .............. 323/207 |

* cited by examiner

Primary Examiner—Matthew V. Nguyen
(74) Attorney, Agent, or Firm—Venable LLP; Eric J. Franklin

(57) ABSTRACT

A device for control of a compensator connected to a polyphase electric transmission network for reactive electric power in dependence on a voltage sensed in the transmission network. A voltage controller, in dependence on the difference of a reference value for the voltage and its sensed value, forms a reference value for a reactive power flow through the compensator. A transformation element represents the sensed voltage as a voltage vector in a rotating two-phase system of coordinates and forms a compensation signal in dependence on a sensed change of the angular position of the voltage vector in the two-phase system of coordinates. A summation element forms the reference value for reactive power flow through the compensator in dependence on the compensation signal.

10 Claims, 4 Drawing Sheets

DEVICE AND A METHOD FOR VOLTAGE CONTROL IN AN ELECTRIC TRANSMISSION NETWORK

TECHNICAL FIELD

The present invention relates to a device for control of a compensator for reactive electric power, connected to a polyphase electric transmission network, and to a method for such control.

BACKGROUND ART

Static compensators for reactive power (Static Var Compensators—SVC) are conventionally used in high-voltage electric transmission networks as a tool for rapid control of the voltage, the compensators being connected to the network in particular in nodes where the network is weak.

In an article in a journal entitled: Static Var Compensator Models for Power Flow and Dynamic Performance Simulation. IEEE Special Stability Controls Working Group. IEE Transactions on Power Systems, Vol. 9, No. 1, February 1994, pages 229–240, various kinds of compensators for the purpose as well as their control systems are described.

As examples of such compensators, the above-mentioned article mentions, among other things, thyristor-controlled reactors (TCR), but recently compensators based on voltage-source converters (VSC) have also been used.

The thyristor-controlled reactor enables a controllable consumption of reactive power and comprises an inductive element, a reactor, in series connection with a controllable semiconductor valve. The controllable semiconductor valve comprises two controllable semiconductors, usually thyristors, in antiparallel connection. By phase-angle control of the semiconductors, that is, by controlling their firing angle relative to the phase position for the voltage of the ac network, the susceptance of the reactor, and hence its consumption of reactive power, may be controlled For a general description of thyristor-controlled reactors, reference is made to Ake Ekström: High Power Electronics HVDC and SVC, Stockholm June 1990, in particular to pages 1-32 to 1-33 and 10-8 to 10-12.

A thyristor-controlled reactor can only consume reactive power, and a compensator based on this technology therefore usually comprises devices for generation of reactive power. Such devices normally comprise one or more mutually parallel-connected filters, each one essentially comprising an inductive element in series connection with capacitive elements and tuned to one or more chosen multiples of the nominal frequency of the ac network, but in many cases capacitor banks, which may be connected in steps, are also included.

Components in the compensator which lie at a high-power level, such as, for example, a thyristor-controlled reactor and the above-mentioned devices for generating reactive power, are usually connected to a busbar at medium-voltage level, typically 15–30 kV, which busbar is connected via a transformer to the high-voltage, typically 130–800 kV, node in the transmission network.

The control system is based on sensing a voltage in the transmission network, usually at the node where the compensator is connected, and comprises a voltage controller for maintaining this voltage constant, generally with built-in statics in dependence on the current through the compensator, as shown in FIG. 2 in the above-mentioned article.

The voltage controller usually has an integrating characteristic and forms an output signal in dependence on the difference between a supplied reference value of the voltage at a point in the network and a similarly supplied actual value, sensed in the network, of this voltage. The output signal of the voltage controller is used as a reference value for the reactive power flow through the compensator. In those cases where the compensator comprises a thyristor-controlled reactor, the output signal from the voltage controller may easily be transformed into a reference value for the susceptance of the thyristor-controlled reactor.

According to the prior art, which will be described in greater detail with reference to the following description of an embodiment of the invention, the voltage in all of the three phases of the network is sensed, whereupon the sensed three-phase voltage is transformed into a two-phase system of coordinates rotating with the angular frequency of the network. In this system of coordinates, the sensed three-phase voltage is represented by a voltage vector which, under stationary conditions, is stationary in the rotating system of coordinates. The magnitude of this voltage vector here constitutes that actual value of the voltage which is supplied to the voltage controller. By a suitable synchronization of the rotating system of coordinates, the sensed voltage is reproduced as a vector which, under stationary conditions, only has a component directed along one axis of the system of coordinates, in the following called the q-axis or the transverse axis, whereas the component of the voltage along the axis orthogonal with the q-axis, in the following called the d-axis or the longitudinal axis, thus has the length zero.

However, it has proved that in cases where the rated power of the compensator corresponds to a considerable part of the short-circuit power of the network at the connection point, typically 25% or more, a control system as the one described above is not capable of controlling the voltage in a satisfactory manner. Normally, the lowest resonant frequency is greater than twice the system frequency, that is, greater than 100 Hz at a system frequency of 50 Hz, but under the conditions mentioned the resonant frequency, especially in the case of long lines and for certain circuit configurations, may approach the system frequency. This implies that, for stability reasons, the amplification of the voltage controller has to be reduced.

In particular, it has proved that, in the case of sudden voltage changes, such as for example switching operations for connecting long lines into the network, overvoltages may in certain case arise, with an ensuing risk of destroying apparatus connected to the network. After an initial reduction of the voltage at the connection point, the connection of a long idling line then results in an overvoltage which remains for a relatively long period of time.

A conventional method of overcoming these problems would be to introduce a proportional-gain characteristic in the voltage controller, which must then in general also be combined with stabilizing measures, such as the introduction of a differentiating characteristic in the controller. However, this has proved not to be a suitable solution, especially not in those cases where the line is to be connected into a transmission network which may exhibit different circuit configurations at different switching times, since in general it is then not possible to find controller settings which give a satisfactory result in all operating cases.

SUMMARY OF THE INVENTION

The object of the invention is to provide a device which makes possible an improved control of the voltage in a transmission network, especially in weak networks, for example in connection-with switching operations, and a method for such control.

It has proved that in case of voltage changes in the network of the kind described above, the voltage vector, which in the above-mentioned rotating two-phase system of coordinates represents the actual value of the voltage, not only exhibits changes in magnitude but also changes in angular position in this system of coordinates. In the special case where, as mentioned above, the rotating system of coordinates is synchronized such that the voltage vector under stationary conditions only has a component directed along the q-axis, the voltage vector thus exhibits, during a transition period, a component along the d-axis, in general a damped oscillating sequence during which the component along the d-axis also changes its direction.

According to the invention, a compensation signal is now formed in dependence on the above-mentioned change of the angular position of the voltage vector in a rotating two-phase system of coordinates, and the reference value for the reactive power flow of the compensator is formed in dependence on the compensation signal and on the output signal from the voltage controller, which in the manner described above according to the prior art, by means of negative feedback, controls the voltage in dependence on the magnitude of the voltage vector.

In the event that the compensator comprises a thyristor-controlled reactor, a reference value for the susceptance of the thyristor-controlled reactor is then formed in dependence on the reference value for the reactive power flow of the compensator, with inverse sign.

Advantageous further developments of the invention will become clear from the following description and the appended claims.

Especially when the rotating system of coordinates is synchronized such that the voltage vector under stationary conditions only has a component directed along the q-axis, the above-mentioned compensation signal is advantageously formed in dependence on the component of the voltage vector along the d-axis.

BRIEF DESCRIPTION OF THE DRAWINGS

The invention will be described in greater detail by description of embodiments with reference to the accompanying drawings, which are all schematic and in the form of single-line diagrams and block diagrams, respectively, and wherein.

DESCRIPTION OF THE PREFERRED EMBODIMENTS

Figure 1:
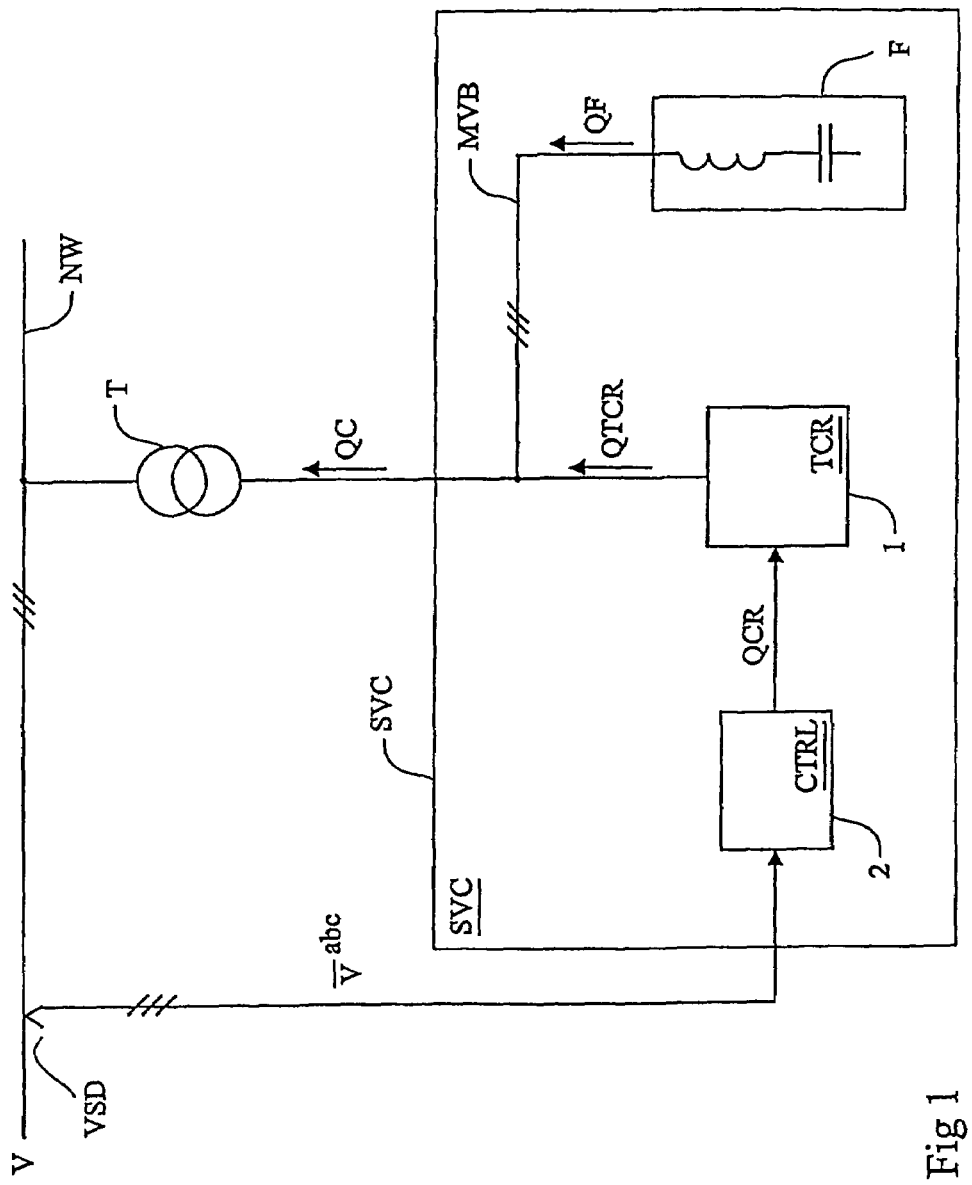
FIG. 1 shows parts of a transmission network with a static compensator for reactive power, connected according to the prior art.

The following description relates both to the method and to the device. The device comprises calculating members, in the figures shown as block diagrams, and it is to be understood that the input and output signals to the respective blocks may consist of signals or calculated values. Signal and calculated value are therefore used synonymously in the following.

In order not to burden the description with distinctions which are self-explanatory to the person skilled in the art, in general the same designations are used for voltages which occur in the transmission network as for the measured values and signals/calculated values, corresponding to these quantities, which are supplied to and processed in the control system which will be described in the following.

The same reference numerals used in the different figures refer to parts of the same kind.

FIG. 1 shows part of a high-voltage transmission network NW, for example a transmission line. A static compensator SVC for compensation of reactive power is connected to the transmission network via en transformer T. The compensator has a busbar MVB at medium-voltage level. The transmission network NW has a voltage level of typically 130–800 kV, and the busbar MVB typically 15–30 kV.

Filter equipment F is connected to the busbar MVB, and this filter equipment may in a known manner comprise one or usually several tuned filters. These filters generate at the system frequency, usually 50 or 60 Hz, a certain reactive power but, in addition thereto, the filter equipment may also comprise capacitor equipment (not shown) for generating additional reactive power. The reactive power generated by the filter equipment is designated QF. A device 1—designed according to some known embodiment—with controllable reactive power consumption and/or reactive power generation, for example, as indicated in the figure, a thyristor-controlled reactor, is also connected to the busbar MVB. A reactive power QTCR flows through the device 1, and from the compensator to the network NW a reactive power QC flows, which is the sum of the powers QF and QTCR, where the power QTCR is negative. The power QTCR is controllable in dependence on a reference value QCR supplied from control equipment 2, and since the power QF generated by the filter equipment is determined by the voltage on the busbar MVB, the power QC flowing from the compensator to the network is controllable via the control equipment.

The voltage in the three-phase transmission network is designated V. The three phases of the network are designated a, b and c and their respective voltages Va, Vb, and Vc. These voltages, in the figure collectively indicated as a voltage vector $\overline{V}^{abc}$, are sensed with a voltage-measuring device VSD and supplied to the control equipment 2. The stroke above V here indicates a vector quantity and a, b and c as upper index indicate the components of the vector in the chosen reference system, in this case a three-phase system.

Figure 2:
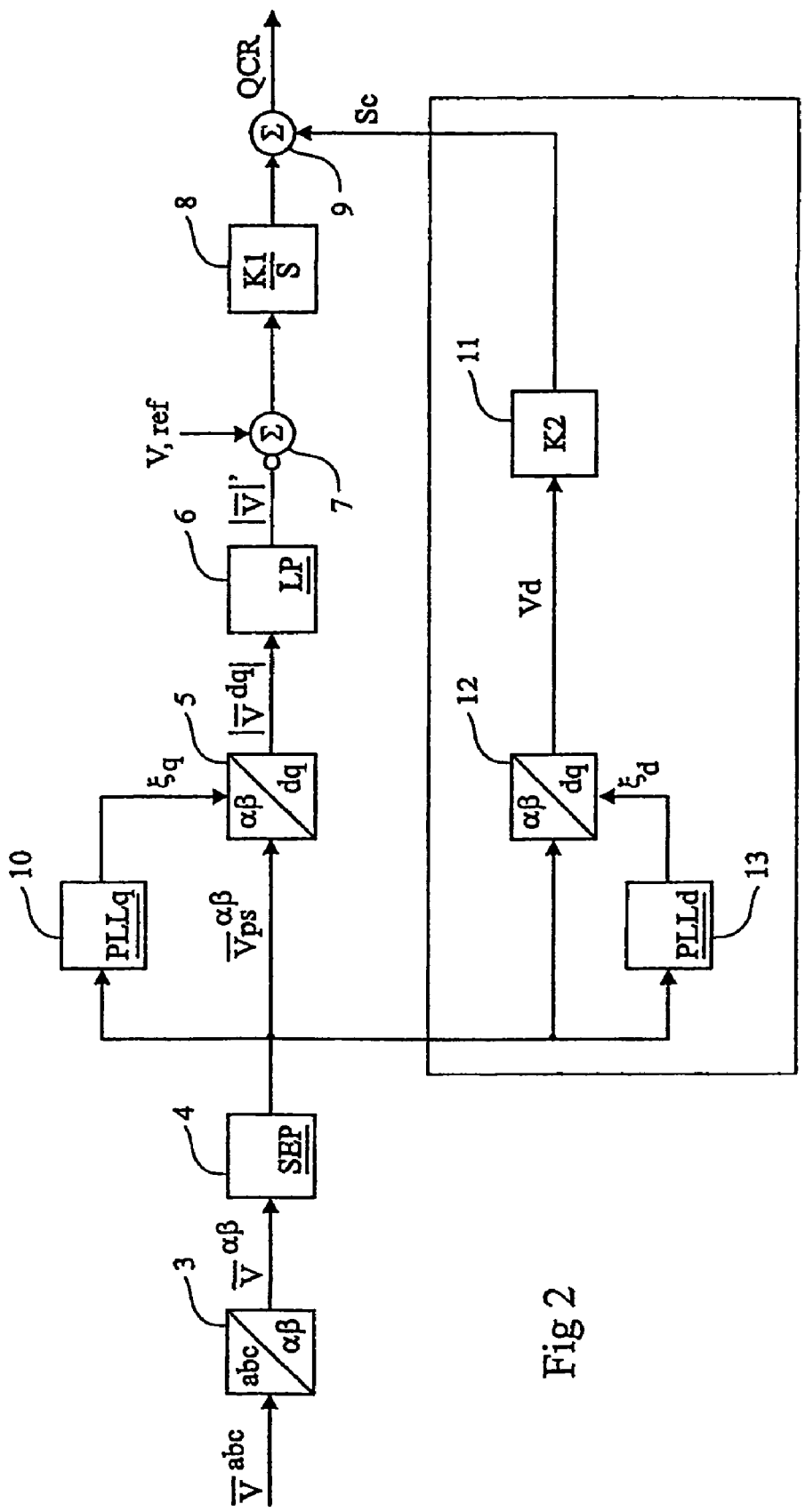
FIG. 2 shows an advantageous embodiment of a control system according to the invention for a compensator according to FIG. 1.

FIG. 2 shows an advantageous embodiment of a control system according to the invention for a compensator according to FIG. 1. By way of introduction, a few transformations between various reference systems, known within this technical field and often used, will first be described.

Preferably, the control system is implemented as software executed on a microcomputer and is hence designed as a sampled system. For practical reasons, the three-phase voltages are transformed via a stationary two-phase αβ reference system into and are expressed in a rotating two-phase dq reference system. The three-phase voltages will thus, under stationary conditions, be represented in the dq reference system by a stationary voltage vector, whose components may be signal-processed separately by means of conventional technique for control systems.

These transformations are dealt with in detail, for example, in Anders Lindberg: PWM and Control of Two and Three Level High Power Voltage Source Converters. Royal Institute of Technology, Department of Electric Power Engineering. Stockholm 1995, appendix A, and only a short summary will be given here.

A set of three-phase quantities, for example voltages, expressed in an abc system and generally designated $x_a$, $x_b$, $x_c$ respectively, is represented in the $\alpha\beta$ system by a vector $\bar{x}^{\alpha\beta}$, where, by definition, $$\bar{x}^{\alpha\beta} = x_\alpha + jx_\beta = \frac{2}{3}(x_a * e^{j0} + x_b * e^{j2\pi/3} + x_c \, e^{-j2\pi/3}) \quad (1)$$

With $\omega$ as designation of the angular frequency of the three-phase transmission network and with $x_a=\hat{x}\cos(\omega t-\phi)$, $x_b=\hat{x}\cos(\omega t-\phi-2\pi/3)$, and $x_c=\hat{x}\cos(\omega t-\phi-4\pi/3)$, the vector $\bar{x}^{\alpha\beta}$ becomes $$\bar{x}^{\alpha\beta}=\hat{x}e^{j(\omega t-\phi)} \quad (2)$$

This vector has the length $\hat{x}$ and rotates at the angular frequency $\omega$ in the stationary $\alpha\beta$ reference system.

A transformation of the vector $\bar{x}^{\alpha\beta}$ into a vector $\bar{x}^{dq}$ in the dq reference system may be formally expressed as $$\bar{x}^{dq}=x_d+jx_q=\bar{x}^{\alpha\beta}*e^{-j\xi} \quad (3)$$

With $\xi=\omega t$ the following is then obtained from expressions (2)–(3)

$$\bar{x}^{dq}=\hat{x}e^{j(\omega t-\phi)}*e^{-j\omega t}=\hat{x}e^{-j\phi} \quad (4)$$

which expresses a vector which, under stationary conditions, is stationary in the rotating dq reference system, and which has a phase position $\phi$ in relation to the direction of the d-axis.

The voltage vector $\bar{V}^{abc}$, sensed by means of the voltage-measuring device VSD (FIG. 1), is supplied to a first transforming member 3, adapted, in some manner known per se, to carry out a transformation according to the expression (1) above. Its output signal thus constitutes a voltage vector $\bar{V}^{\alpha\beta}$, corresponding to the voltage V in the transmission network but expressed in the $\alpha\beta$ reference system.

The voltage vector $\bar{V}^{\alpha\beta}$ is supplied to a calculating member 4, adapted, in some manner known per se, to separate, from the voltage vector supplied thereto, its positive-sequence component and to forward only this component. A description of how this separation is carried out is outside the scope of this description but a detailed description with block diagrams of how this may be carried out is given on pages 81–84 in the above-mentioned article by Anders Lindberg. The positive-sequence component of the voltage vector $\bar{V}^{\alpha\beta}$, in FIG. 2 designated $\bar{V}_{ps}^{\alpha\beta}$, forwarded by the calculating member 4, is supplied to a second transforming member 5, adapted, in some manner known per se, to carry out a transformation according to the expression (3) above. In this transforming member, there are thus created two components $V_d$ and $V_q$ of the voltage vector $\bar{V}^{dq}$, representing the voltage V in the transmission network, expressed in two components, perpendicular to each other, in a dq reference system rotating with the angular frequency $\omega$ and defined by this transformation member. The component $V_d$, in the following referred to as the longitudinal component, is the component of the voltage vector along the d-axis, and the component $V_q$, in the following referred to as the transverse component, is its component along the q-axis.

According to the prior art, an absolute value $|\bar{V}^{dq}|$ of the voltage vector, formed in some known manner, is forwarded to a low-pass filtering member 6, the output signal $|\bar{V}|^1$ of which is supplied to a difference-forming member 7. The difference-forming member is also supplied with a reference value V,ref for the absolute value of the voltage vector and forms, as output signal, the difference between the two supplied signals (a ring at an input on the symbol for the difference-forming member 7 designates a negating input). This output signal is supplied to a voltage controller 8, the output signal of which according to conventional technique constitutes the reference value QCR for the controllable reactive power flow of the compensator, mentioned with reference to FIG. 1. In a conventional manner, the voltage controller has a integrating characteristic with an integration-interval constant equal to 1/K1.

The variable $\xi=\omega t$ occurring in expression (3), and designated $\xi_q$ in the figure for reasons which will become clear in the following, is generated, also in some manner known per se, by a phase-locked circuit 10 in dependence on the supplied voltage vector $\bar{V}_{ps}^{\alpha\beta}$ and synchronizes the rotating system of coordinates such that, under stationary conditions, the voltage vector $\bar{V}^{dq}$ only has a component $V_d$ along the q-axis whereas the component $V_d$ under these conditions is equal to zero.

In a preferred embodiment of the invention, and for reasons which will be described in more detail in the following description, the voltage vector $\bar{V}_{ps}^{\alpha\beta}$ is also supplied to a transforming member 12. This transforming member is of the same kind as the transforming member 5 and thus also creates two components $V_d$ and $V_q$ of the voltage vector $\bar{V}^{dq}$, representing the voltage V in the transmission network, expressed in two components, perpendicular to each other, in a dq reference system rotating with the angular frequency $\omega$ and defined by the transformation member 12.

As mentioned above under the section SUMMARY OF THE INVENTION, it has proved that, for example, in the case of switching sequences of the kind described in the introduction, both the magnitude of the voltage vector and the angular position thereof in a two-phase reference system will exhibit changes.

According to the invention, the change in angular position of the voltage vector in a two-phase system of coordinates rotating with the angular frequency $\omega$ is now sensed, which system, in this embodiment of the invention, is defined by the transforming member 12.

In particular, the system of coordinates defined by the transformation member 12 may thus be synchronized such that the voltage vector therein, under stationary conditions, only exhibits a component along the q-axis. The change in angular position of the voltage vector, in case of a disturbance of the line voltage, is thus represented by the component $V_d$ of the voltage vector along the d-axis.

According to this special embodiment of the invention, the longitudinal component $V_d$ of the voltage vector is thus utilized for control of the compensator. This component is supplied to a multiplying member 11 adapted, in some known manner, to multiply the signal supplied thereto by a factor K2, whereupon the output signal Sc from the multiplying member 11 and the output signal from the voltage controller 8 are both supplied to a summing member 9. According to the invention, the signal from the summing member 9 constitutes the reference value QCR, mentioned with reference to FIG. 1, for the controllable reactive power flow of the compensator.

Although, as mentioned above, a longitudinal component $V_d$ is formed also in the rotating system of coordinates which is defined by the transforming member 5, the creation of a rotating system of coordinates, independent of this and defined by the transforming member 12, implies a possibility of dynamic adaptation of the interference which the sensed change of the angular position of the voltage vector is to achieve when forming a reference value QCR.

A phase-locked circuit of the kind described above achieves a synchronization between the rotating system of coordinates and the voltage vector which implies that the latter, under stationary conditions, is stationary in the system of coordinates and has an angular position relative to this, in principle given by the expression (4) above. Upon changes of the phase position of the supplied voltage, that is, of its angular position relative to the system of coordinates, such a phase-locked circuit exhibits a time constant which involves a delay in the capacity of the system of coordinates to follow these changes. A short delay thus implies that the synchronization relatively rapidly seeks to restore the angular position of the voltage vector relative to the system of coordinates, whereas a long delay implies that a change of the angular position of the voltage vector, caused, for example, by a switching operation in the transmission network, will remain for a longer period of time.

The variable $\xi=\omega t$, occurring in expression (3) and designated $\xi_d$ in the figure, is generated by a phase-locked circuit 13 in a manner similar to that described above. The time constant in the phase-locked circuit 13, which in a manner known per se is dependent on design parameters for the phase-locked circuit, may then be advantageously adapted to the dynamic properties of the transmission network to dynamically optimize the interference achieved by the sensed change of the angular position of the voltage vector in the formation of the reference value QCR, in the manner described above.

The transformation member 12, the phase-locked circuit 13, and the multiplying member 11 thus constitute transformation means which represent the sensed voltage as a voltage vector $\overline{V}^{dq}$ in a rotating two-phase system of coordinates and form a compensation signal Sc in dependence on a sensed-change of the angular position of the voltage vector in the two-phase system of coordinates. The dynamic properties of the transformation means are capable of being influenced by means of the delay in the synchronization of the rotating system of coordinates, in the preferred embodiment of the invention via the delay in the phase-locked circuit 13, whereas its amplitude may be influenced by means of the multiplying member 11. The transformation member 12 and the phase-locked circuit 13 constitute phase-correcting means which, in dependence on the delay of the phase-locked circuit, dynamically correct the angular position of the voltage vector in the rotating system of coordinates. Especially in the event that the phase-locked circuit, as discussed above, is arranged with a long delay, the dynamic behaviour of the control system may also be influenced by arranging the multiplying member 11 such that, within a suitably chosen frequency range, it also exhibits a phase-advancing characteristic.

The multiplying member 11 may advantageously be arranged with a dead band (not shown) on its output so that the magnitude of its input signal must exceed a chosen level to be forwarded multiplied by the factor K2, whereas variations in its input signal which, in magnitude, are lower than this level are ignored.

Figure 3:
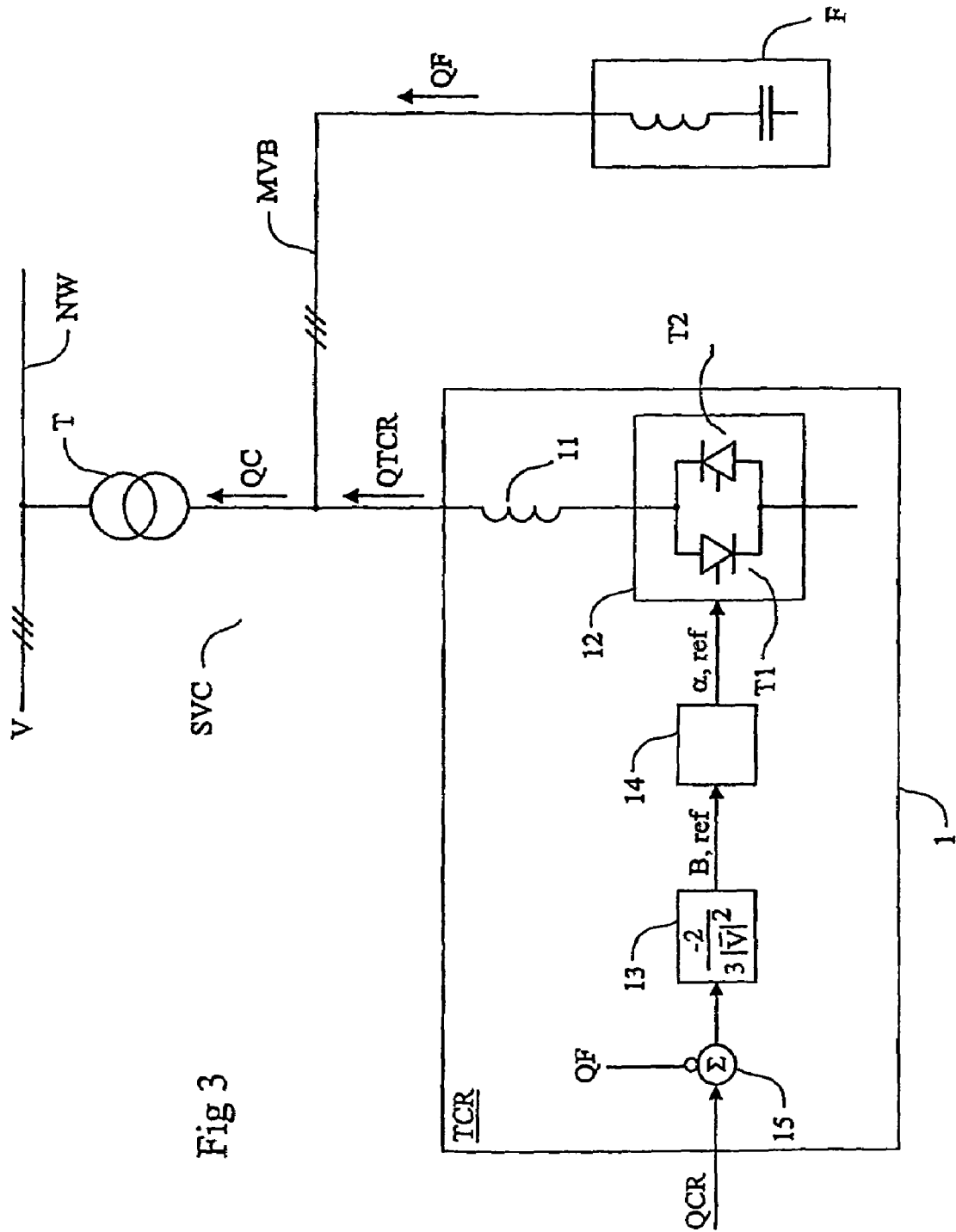
FIG. 3 shows a static compensator with a thyristor-controlled reactor for use with a control system according to FIG. 2.

FIG. 3 shows an embodiment of a static compensator with a thyristor-controlled reactor 1, advantageous for use with a control system according to the invention. The thyristor-controlled reactor is connected in conventional manner to a busbar MVB at medium-voltage level, to which also filter equipment F of the kind mentioned above is connected. The filter equipment generates a reactive power designated QF.

The compensator comprises a reactor 11 connected in series with a controllable semiconductor circuit 12, comprising two thyristors T1, T2 in antiparallel connection. The susceptance of the reactor, and hence its consumption of reactive power, are controllable in a manner known per se by phase-angle control of the thyristors, that is, by control of their firing angle relative to the phase position for the voltage of the ac network.

Between the consumption QTCR of reactive power by the thyristor-controlled reactor and the susceptance B thereof, the following known relationship applies $$QTCR = -\tfrac{1}{2} * B * |\overline{V}|^2 \qquad (5)$$

where $|\overline{V}|$ designates the absolute value of the voltage vector $\overline{V} = V_d + jV_q$.

The reference value QCR, generated according to the invention by the control equipment 2 described with reference to FIG. 2, for the reactive power flow through the compensator is supplied to a difference-forming member 15. The difference-forming member is also supplied, with a negative sign, with a value, formed in some known manner, of the reactive power QF generated by the filter equipment, and forms as output signal the difference between the quantities supplied thereto.

This difference is supplied to a calculating member 13 adapted, in some known manner in accordance with the expression (5), to transform this reference value to a reference value B,ref for the susceptance of the reactor.

Between the susceptance B and the firing angle α, the following known relationship applies $$B(\alpha) = -[2(\pi - \alpha) + \sin 2\alpha]/\pi \omega L \qquad (6)$$

The reference value B,ref for the susceptance of the reactor is supplied to a calculating member 14 which generates a reference value a,ref for the firing angle α of the thyristors.

Figure 4:
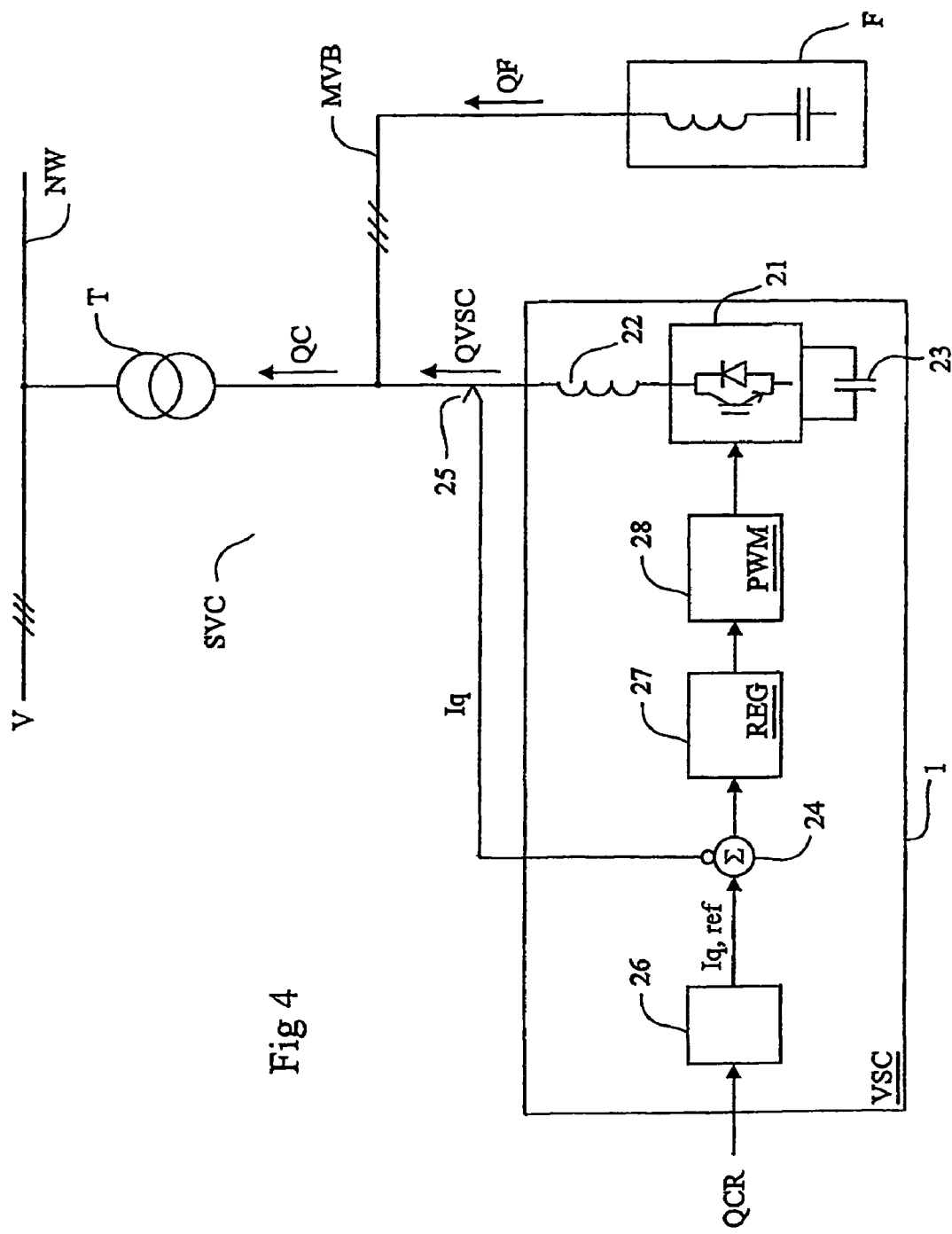
FIG. 4 shows a static compensator with a voltage-source converter for use with a control system according to FIG. 2.

FIG. 4 shows an embodiment of a static compensator with a voltage-source converter 21, which is also advantageous for use in a control system according to the invention.

The converter is connected in conventional manner, on its ac-voltage side, via an inductor 22, to a busbar MVB at medium-voltage level, to which also filter equipment F of the kind described above is connected. The filter equipment generates a reactive power designated QF. Capacitor equipment 23 is connected to the dc-voltage side of the converter. The power flow through the converter is designated QVSC.

The reference value QCR, generated according to the invention by the control equipment 2 described with reference to FIG. 2, for the reactive power flow through the compensator is supplied to a transforming member 26 which, in a manner known per se, transforms the supplied reference value to a reference value $I_q$, ref for the reactive current of the converter. Measurement equipment 25, only schematically shown, forms in some manner, similarly known per se, the actual value $I_q$ representing the reactive current of the converter.

The reference value and the actual value of the reactive current of the converter are supplied to a difference-forming member 24, which forwards the difference between the supplied signals to a current controller 27.

The output signal from the current controller, which has the character of a reference value for the phase voltages generated by the converter, is supplied to a pulse-generating unit 28, which in a manner known per se, in accordance with a chosen pulse-width-modulating (PWM) pattern in dependence thereon, generates a train of pulses for firing and extinction, respectively, of the semiconductor valves included in the converter.

The described current-control system for the converter may advantageously be designed to operate according to principles described in the previously mentioned article by Anders Lindberg: PWM and Control of Two and Three Level High Power Voltage Source Converters. Royal Institute of Technology, Department of Electric Power Engineering. Stockholm 1995, in particular on pages 34–35 and 77–104.

What is claimed is:

1. A device for control of a compensator, connected to a polyphase electric transmission network, for reactive electric power in dependence on a voltage sensed in the transmission network, the device having a voltage controller which, in dependence on the difference of a reference value for said voltage and its sensed value, forms a reference value for a reactive power flow through the compensator, wherein the device comprises transformation means, which represent the sensed voltage as a voltage vector in a rotating two-phase system of coordinates and forms a compensation signal in dependence on a sensed change of the angular position of the voltage vector in the two-phase system of coordinates, and further comprises summation means for forming the reference value for reactive power flow through the compensator in dependence on the compensation signal.

2. The device according to claim 1, wherein said transformation means comprise phase-correcting means which dynamically influence the angular position of the voltage vector relative to said system of coordinates and amplitude-correcting means for influencing the amplitude of the compensation signal.

3. The device according to claim 2, wherein said phase-correcting means comprise a phase-locked circuit and a transforming member, whereby the transforming member forms the voltage vector in said rotating two-phase system of coordinates in dependence on the phase-locked circuit and on the voltage sensed in the transmission network.

4. The device according to claim 3, wherein said phase-correcting means form the voltage vector in said rotating two-phase system of coordinates such that, under stationary conditions, the voltage vector coincides with a first axis in the system of coordinates and that said transformation means form the compensation signal in dependence on a component of the voltage vector which coincides with a second axis in the system of coordinates, perpendicular to the first one.

5. The device according to claim 1, wherein the compensator comprises a thyristor-controlled reactor and wherein the reference value for the susceptance of the thyristor-controlled reactor is formed in dependence on said reference value of the reactive power flow through the compensator.

6. A method for control of a compensator, connected to a polyphase electric transmission network, for reactive electric power in dependence on a voltage sensed in the transmission network, whereby a voltage controller is supplied with a reference value for said voltage and, in dependence on the difference of the reference value and the sensed value of the voltage, forms a reference value for a reactive power flow through the compensator, wherein a voltage vector is formed which represents the sensed voltage in a rotating two-phase system of coordinates, a compensation signal is formed in dependence on a sensed change of the angular position of the voltage vector in the two-phase system of coordinates, and the reference value for reactive power flow through the compensator is formed in dependence on the compensation signal.

7. The method according to claim 6, wherein the angular position of the voltage vector relative to said system of coordinates is dynamically influenced by means of phase-correcting means, and the amplitude of the compensation signal is influenced by means of amplitude-correcting means.

8. A The method according to claim 7, wherein the voltage vector in said rotating two-phase system of coordinates is formed in dependence on a transforming means and a phase-locked circuit and on the voltage sensed in the transmission network.

9. The method according to claim 8, wherein the voltage vector is formed in said rotating two-phase system of coordinates such that, under stationary conditions, the voltage vector coincides with a first axis in the system of coordinates, and the compensation signal is formed in dependence on a component of the voltage vector which coincides with a second axis in the system of coordinates, perpendicular to the first one.

10. The method according to claim 6, wherein the compensator comprises a thyristor-controlled reactor, and wherein the reference value for the susceptance of the thyristor-controlled reactor is formed in dependence on said reference value for the reactive power flow through the compensator.

* * * * *